US006753291B2

(12) United States Patent
Eijsbouts et al.

(10) Patent No.: US 6,753,291 B2
(45) Date of Patent: *Jun. 22, 2004

(54) PROCESS FOR SULFIDING AN ADDITIVE-CONTAINING CATALYST

(75) Inventors: Sonja Eijsbouts, Nieuwkuijk (NL); Frans Lodewijk Plantenga, Amersfoort (NL); Pierre Dufresne, Valence (FR); Franck Labruyere, Saint Georges les Bains (FR); Leendert Arie Gerritsen, Lunteren (NL)

(73) Assignees: Akzo Nobel N.V., Arnhem (NL); Eurecat Europeenne de Retraltement de Catalysateur S.A., La-Voulte-sur-Rhone (FR)

( * ) Notice: Subject to any disclaimer, the term of this patent is extended or adjusted under 35 U.S.C. 154(b) by 80 days.

This patent is subject to a terminal disclaimer.

(21) Appl. No.: 09/829,638

(22) Filed: Apr. 10, 2001

(65) Prior Publication Data

US 2002/0013223 A1 Jan. 31, 2002

Related U.S. Application Data

(60) Provisional application No. 60/199,766, filed on Apr. 26, 2000.

(30) Foreign Application Priority Data

Apr. 11, 2000 (EP) .............................. 00400992

(51) Int. Cl.[7] .................. B01J 27/02; B01J 27/047; B01J 27/051; B01J 27/043; B01J 23/00
(52) U.S. Cl. ................. 502/216; 502/219; 502/220; 502/221; 502/222; 502/313
(58) Field of Search ............. 502/216, 219–222, 502/313

(56) References Cited

U.S. PATENT DOCUMENTS

| 4,028,227 | A |   | 6/1977  | Gustafson ............. 208/216   |
| 4,530,917 | A | * | 7/1985  | Berrebi ............... 502/220   |
| 4,719,195 | A | * | 1/1988  | Toulhoat et al. ....... 502/216   |
| 5,045,518 | A |   | 9/1991  | Heinerman et al. ..... 502/216   |
| 5,462,904 | A | * | 10/1995 | Resasco et al. ........ 502/222   |
| 6,059,956 | A | * | 5/2000  | Dufresne .............. 208/108   |
| 6,077,807 | A | * | 6/2000  | Seamans et al. ........ 502/172   |
| 6,280,610 | B1| * | 8/2001  | Uragami et al. ....... 208/216 R |

FOREIGN PATENT DOCUMENTS

| EP | 0 181 035 A1 | 5/1986 | ........... B01J/23/88 |
| EP | 0 601 722 A1 | 6/1994 | ........... C10G/45/08 |
| WO | WO 96/41848  | 12/1996| ........... C10G/45/08 |

OTHER PUBLICATIONS

Chemical Abstract for Japanese Patent No.: JP 04166231–A Oct. 1990.
Chemical Abstract for Japanese Patent No.: JP 04166233–A Oct. 1990.
Chemical Abstract for Japanese Patent No.: JP 06339635–A Jun. 1993.
Chemical Abstract for Japanese Patent No.: JP 06210182–A Jan. 1993.
Chemical Abstract: NL8900–914–A Apr. 1989.
Derwent Abstract EP–897748 Feb. 1999.
Journal of Catalysis vol. 144; 1993; pp. 579–596; The Effect of Passivation on the Activity and Structure of Sulfided Hydrotreating Catalysts; Louwers, et al. Feb. 1993.
Catalysis Today, vol. 10; 1991; pp. 345–352 The Effect of Passivation on the Activity of Sulfided Mo And Co–Mo Hydrodesulphurization Catalysts; V.M. Browne et al. No month avail.
European Search Report Feb. 2000.

* cited by examiner

Primary Examiner—Mark L. Bell
Assistant Examiner—Patricia L. Hailey
(74) Attorney, Agent, or Firm—Louis A. Morris

(57) ABSTRACT

The present invention pertains to a process for sulfiding a catalyst composition comprising at least one hydrogenation metal component of Group VI and/or Group VIII of the Periodic Table, and an organic additive wherein the catalyst composition is first contacted with an organic liquid, followed by the catalyst being contacted with hydrogen and a sulfur-containing compound in the gaseous phase, wherein less than about 40%, preferably less than about 35%, more preferably less than about 25%, most preferably less than about 15%, of the sulfur present in the sulfided catalyst is added with the organic liquid. The process of the present invention makes it possible to use additive-containing catalysts without loss of activity in units which cannot effect gas phase start-up or are required to carry out a pressure test. The organic liquid may be a hydrocarbon with a boiling range of about 150–500° C., preferably gasoline, white spirit, diesel, gas oil, mineral lube oil, or white oil. The step of contacting the catalyst with hydrogen and a sulfur-containing compound may take place in one step at a temperature of about 150–450° C. It may also take place in two steps, with the first step being performed at a temperature which is lower than that of the second step, with the first step being carried out at a temperature of about 100–250° C. and the second step at a temperature of about 150–450° C.

34 Claims, No Drawings

PROCESS FOR SULFIDING AN ADDITIVE-CONTAINING CATALYST

CROSS REFERENCE TO RELATED APPLICATIONS

This application claims priority from European Patent Application No. EP00400992.4, filed Apr. 11, 2000 and U.S. Provisional Application No. 60/199,766 filed Apr. 26, 2000.

BACKGROUND OF THE INVENTION

1. Field of the Invention

The present invention relates to a process for sulfiding organic additive-containing catalysts, in particular organic additive-containing hydrotreating catalysts.

2. Description of the Prior Art

Hydrotreating catalysts comprise hydrogenation metal components, generally a Group VI metal component such as molybdenum and/or tungsten and a Group VIII metal component, such as nickel and/or cobalt generally on an oxidic carrier.

Organic additive-containing hydrotreating catalysts are known in the art. For example, European patent application 0 601 722 describes hydrotreating catalysts comprising a gamma-alumina support impregnated with a Group VIB metal component, a Group VIII metal component, and an organic additive which is at least one compound selected from the group of compounds comprising at least two hydroxyl groups and 2–10 carbon atoms, and the ethers and polyethers of these compounds.

Japanese patent application 04-166231 describes a hydrotreating catalyst prepared by a process in which a support is impregnated with an impregnation solution comprising a Group VIB metal component, a Group VIII metal component, and, optionally, a phosphorus component. The support is dried at a temperature below 200° C., contacted with a polyol, and then dried again at a temperature below 200° C. Japanese patent application 04-166233 describes an alkoxycarboxylic acid-containing catalyst prepared by substantially the same process.

Japanese patent application 06-339635 describes a hydrotreating catalyst prepared by a process in which a support is impregnated with an impregnation solution comprising an organic acid, Group VIB and Group VIII hydrogenation metal components, and preferably a phosphorus component. The impregnated support is dried at a temperature below 200° C. The dried impregnated support is contacted with an organic acid or polyol, after which the thus treated support is dried at a temperature below 200° C.

Japanese patent application 06-210182 describes an additive-containing catalyst based on a boria-alumina support comprising 3–15 wt. % of boria. Non-prepublished European patent application No. 99201051.2 in the name of Akzo Nobel filed on Apr. 8, 1999, describes a catalyst containing an organic compound comprising N and carbonyl.

The additive-containing catalysts of the above references all show an increased activity in the hydrotreating of hydrocarbon feeds as compared to comparable catalysts which do not contain an organic additive.

Before use, the hydrogenation metal components present in hydrotreating catalysts, including the additive-containing catalysts of the above references, will generally be converted into their sulfides. This process is conventionally indicated as sulfidation or presulfidation. It is generally done before the catalyst is used in hydrotreating to ensure a stable reactor performance.

The above-mentioned references indicate that the catalysts described therein can suitably be sulfided in the hydrotreating reactor by being contacted in the liquid phase with a sulfur-containing hydrocarbon feed in the presence of hydrogen. This can either be a feed to which a sulfur component, e.g., dimethyldisulfide, has been added (spiked feed) or, if the sulfur content of the feed to be hydrotreated is sufficiently high, the feed itself.

However, not all hydrotreating units are suitable for such in situ liquid sulfidation procedures. Some hydrotreating units use a gas phase sulfiding process, conventionally with $H_2S$ and $H_2$ or with $H_2$ and a compound which decomposes into $H_2S$, such as DMDS.

Moreover, some hydrotreating units are required by the authorities to carry out a pressure test as part of their start-up procedure. This pressure test is generally carried out in the presence of hydrogen at a pressure above operating pressure and a temperature above 100° C. in the absence of liquid.

It has been found that when an additive-containing catalyst is subjected to a gas phase start-up procedure or a start-up procedure including a pressure test, the activity of the catalyst is not good.

There is therefore need for a process for sulfiding additive-containing catalysts which would make it possible to obtain catalysts suitable for units which cannot perform sulfidation in the liquid phase or which are required to carry out a pressure test as described above.

SUMMARY OF THE INVENTION

In one embodiment, our invention is the obtaining of sulfided catalysts with a high activity by way of a gas phase sulfidation process in which a catalyst composition comprising at least one hydrogenation metal component of Group VI and/or Group VIII of the Periodic Table and an organic additive is first contacted with an organic liquid, followed by the catalyst being contacted with hydrogen and a sulfur-containing compound in the gaseous phase, wherein less than 40% of the sulfur present in the sulfided catalyst is added with the organic liquid.

In a second embodiment, our invention is a catalyst obtained by the above process.

In a third embodiment, our invention is a process for hydrotreating a hydrocarbon feed by contacting the feed with the above catalyst at hydrotreating conditions.

Other embodiments of our invention encompass details about reactant compositions, process steps and conditions, etc., all of which are hereinafter disclosed in the following discussion of each of the facets of our invention.

DETAILED DESCRIPTION OF THE INVENTION

The Sulfidation Process

In the process according to the invention, the organic additive-containing catalyst is first contacted with an organic liquid. The organic liquid generally has a boiling range of about 100–550° C., preferably about 150–500° C. It generally is a petroleum fraction. By their nature, petroleum fractions comprise less than about 12 wt. % of oxygen. Petroleum fractions comprising less than about 8 wt. % of oxygen, preferably less than about 5 wt. %, more preferably less than about 2 wt. %, specifically less than about 0.5 wt. % of oxygen, may be preferred. Although the olefin content of the organic liquid is not critical to the process according to the invention, petroleum fractions with and iodine number of about 50 or less, specifically about 30 or less, may be preferred. Examples of suitable petroleum fractions include fractions comprising heavy oils, lubricating oil fractions like mineral lube oil (360° C.<BP<500° C.), atmospheric gas oils, vacuum gas oils, straight run gas oils (250° C.<BP<350° C.), white spirit (180° C.<BP<220° C.), middle distillates like diesel, jet fuel and heating oil, naphthas, and gasoline. Preferably white oil, gasoline, diesel, gas oil, or mineral lube oil is used.

The organic liquid ensures that the catalyst is able to withstand the conditions prevailing during the actual sulfidation step, that is, during the contacting of the catalyst with hydrogen and a sulfur-containing compound, or during the pressure test. The organic liquid is not particularly intended to bring sulfur into the catalyst. Nevertheless, petroleum cuts such as a gas oil or diesel may sometimes contain sulfur. Generally, the organic liquid will contain less than about 10 wt. % of sulfur, preferably less than about 5 wt. %. The amount of sulfur added with the organic liquid will be less than about 40%, preferably less than about 35% of the total amount of sulfur added to the catalyst with the organic liquid and by way of the sulfur-containing compound applied in the gaseous phase, more preferably less than about 25%, even more preferably less than about 15%.

The amount of organic liquid generally is about 20–500% of the catalyst pore volume which can be filled with the liquid at issue under the conditions of application of the liquid. The pore volume can easily be determined by slowly adding liquid under said conditions to a certain amount of catalyst in a closed flask while shaking and determining by visual inspection when the liquid is no longer adsorbed. Another method is to add excess liquid and to remove the excess from the catalyst, e.g., by centrifugation. The person skilled in the art of pore volume impregnation is familiar with these procedures. To get the desired effect and avoid waste of material an amount of about 50–200%, more in particular about 50–125%, is preferred. Evidently, if excess liquid is present it can easily be removed, e.g., by drying the catalyst.

The way in which the catalyst is contacted with the organic liquid is not critical to the invention as long as it is ensured that each catalyst particle is contacted with the organic liquid. Conventional mixing methods may be applied. The organic liquid is generally contacted with the catalyst particles at a temperature between room temperature and about 200° C. Increased temperatures may sometimes be desired because they decrease the viscosity of the liquid. The suitable contacting time may depend on whether the operation is carried out ex situ or in situ. For ex situ operation the temperature may preferably be between room temperature and about 75° C. For in situ operation the temperature may preferably be between about 100 and 175° C. The contacting of the catalyst with organic liquid is carried out in the substantial absence of hydrogen.

After the incorporation of an organic liquid, the catalyst is contacted in the gaseous phase with hydrogen and a sulfur-containing compound. The sulfur-containing compound is $H_2S$ and/or a compound which is decomposable into hydrogen sulfide under the conditions prevailing during the contacting of the catalyst with hydrogen and a sulfur-containing compound. Examples of suitable components decomposable into $H_2S$ are mercaptans, $CS_2$, thiophenes, dimethyl sulfide (DMS), dimethyl disulfide (DMDS), and suitable S-containing refinery gasses and various polysulfides. The use of $H_2S$ alone is preferred. The skilled person knows how to select a sulfur compound which will decompose under the conditions applied.

The total amount of sulfur-containing compound which is incorporated into the catalyst in the process according to the invention is generally selected to correspond to about 50–500%, preferably about 70–200%, more preferably about 80–150%, of the stoichiometric sulfur quantity necessary to convert the hydrogenation metals into $Co_9S_8$, $MoS_2$, $WS_2$, and $Ni_3S_2$, respectively. Gas recycle may be attractive.

The concentration of sulfur-containing compound in the mixture of $H_2$ and sulfur-containing compound is generally selected to be between about 1 and 99 wt. %, preferably between about 10 and 80%, calculated as $H_2S$ on the total of $H_2S$ and hydrogen. Of course, lower sulfur concentrations in this mixture will either lengthen the duration of this process step or increase the required space velocity.

The contacting in the gaseous phase with hydrogen and a sulfur-containing compound can be done in one step. In that case, it is preferably carried out at a temperature of about 150–500° C., preferably 225–400° C. More precisely, when indicating a sulfiding temperature of e.g., about 350° C., it means that the final temperature plateau is at about 350° C. The temperature of the first contact between sulfiding agent and catalyst may preferably take place at a lower temperature, for instance between room temperature and about 200° C.

Catalysts with a higher activity may be obtained when the contacting in the gaseous phase with hydrogen and a sulfur-containing compound is carried out in two steps, with the first step being performed at a lower temperature than the second step. In this embodiment the first step is generally carried out at a final temperature of about 50–250° C., preferably about 100–225° C. The second step is generally carried out at a final temperature of about 150–500° C., preferably about 200–450° C., more preferably about 225–400° C. In this two-step embodiment, the gaseous mixtures of $H_2$ and sulfur-containing compound applied in the two steps may be the same or different. If so desired, this part of the process may also be carried out in more than two steps, e.g., in three steps or in a continuous mode, as long as the first step, or the start of this part of the process, is carried out at a lower temperature than a further step, or later part of this part of the process.

The total pressure during the process according to the invention, more in particular, the pressure in the gaseous phase, is not critical. It will generally be between atmospheric pressure and about 300 bar, depending on where the process is carried out. If the process is carried out ex situ, the pressure may, e.g., be between atmospheric pressure and about 10 bar. If the process is carried out in situ, the pressure may be much higher, e.g., in the range of about 25 to 300 bar.

The contacting in the gaseous phase with hydrogen and a sulfur-containing compound can be carried out in any suitable manner, including in fixed bed processes and moving bed processes. Since the sulfiding step is exothermic by nature, it is important that the temperature of the catalyst is well-controlled. Generally, such control is easier in a moving bed process. In the context of the present specification, a moving bed process is intended to encompass all processes in which the catalyst moves relative to the reactor. Examples are ebullated bed processes, fluidized bed processes and processes carried out in a rotary furnace. In the latter, the contacting can be done either co-currently or counter-currently, with counter-current operation being preferred. It is noted that the S-containing compound present in the gas phase does not refer to decomposition products from the S-containing compounds, if any, incorporated therein with the organic liquid, but refers to S-containing compound added extraneously to the hydrogen.

The various steps of the process according to the invention can be carried out ex situ or in situ. In the context of the present specification, the term in situ means in the reactor in which the catalyst will eventually be applied to effect hydrotreating. Conversely, ex situ means outside said reactor.

For example, it is possible to effect the contacting with the organic liquid ex situ while the contacting with hydrogen and a sulfur-containing compound is effected in situ, optionally with a pressure test being carried out before the contacting with hydrogen and a sulfur-containing compound. It is also possible to effect the complete process ex situ, or to effect the complete process in situ. It is generally preferred to carry out the complete process ex situ, because this generates less downtime for the hydrotreating reactor and simplifies the reactor start-up.

If the process according to the invention is carried out ex situ, it may be desirable to passivate the sulfided catalyst prepared in this way, since sulfided catalysts are self-heating. Passivation can be done by contacting the sulfided catalyst with an oxygen-containing compound under controlled conditions. The use of an oxygen-containing gas, such as air, is a well-known embodiment. Alternatively, the sulfided catalyst may be passivated by being contacted with an organic liquid, such as diesel, gas oil, white spirit, or lube oil. Passivation processes are known in the art. See, for example, EP-897 748 and NL 8900914, which describe the use of hydrocarbons, and V. M. Browne, S. P. A. Louwers, and R. Prins, *Catalysis Today* volume 10 number 3 pp 345–52 (1991) and S. P. A. Louwers, M. W. J. Craje, C. Geantet, A. M. van der Kraan, and R. Prins, *Journal of Catalysis* volume 144 number 2 pp. 579–96 (1993), both of which describe the use of oxygen.

The Additive-containing Catalyst

In principle, the additive-containing catalyst can be any catalyst which comprises a Group VIB hydrogenation metal component and/or a Group VIII hydrogenation metal component, and an organic additive, generally on a carrier. Catalysts comprising the combination of a Group VIB hydrogenation metal component and a Group VIII hydrogenation metal component are preferred. As the skilled person will recognise, the metals may be present in any form. When they are incorporated into the catalyst composition they are often in the form of their salts or oxides. After calcination they are converted partly or wholly into their respective oxides. After sulfidation and during use the metals are at least partly present in the sulfidic form.

As Group VIB metals may be mentioned molybdenum, tungsten, and chromium. Group VIII metals include nickel, cobalt, and iron. Catalysts comprising molybdenum and/or tungsten as Group VIB metal component and nickel and/or cobalt as Group VIII metal component are the most common. The catalyst usually has a metal content in the range of about 0.1 to 50 wt. % calculated as oxides on the dry weight of the catalyst not containing the additive. The Group VIB metal will frequently be present in an amount of about 5–40 wt. %, preferably about 15–30 wt. %, calculated as trioxide. The Group VIII metal will frequently be present in an amount of about 1–10 wt. %, preferably about 2–7 wt. %, calculated as monoxide. The catalyst may also contain other components, such as phosphorus, halogens, and boron. Particularly, the presence of phosphorus in an amount of about 1–10 wt. %, calculated as $P_2O_5$, may be preferred.

The catalyst carrier which is generally present may comprise the conventional oxides, e.g., alumina, silica, silica-alumina, alumina with silica-alumina dispersed therein, silica-coated alumina, magnesia, zirconia, boria, and titania, as well as mixtures of these oxides. As a rule, preference is given to the carrier comprising alumina, silica-alumina, alumina with silica-alumina dispersed therein, or silica-coated alumina. Special preference is given to the carrier consisting essentially of alumina or alumina containing up to about 25 wt. % of other components, preferably silica. A carrier comprising a transition alumina, for example an eta, theta, or gamma alumina is preferred within this group, with a gamma-alumina carrier being especially preferred. Additionally, although at present less preferred, the catalyst may contain 0–60 wt. % of zeolite.

The catalyst's pore volume (measured via $N_2$ adsorption) generally is in the range of about 0.25 to 1 ml/g. The specific surface area will generally be in the range of about 50 to 400 $m^2/g$ (measured using the BET method). Generally, the catalyst will have a median pore diameter in the range of about 7–20 nm, as determined by $N_2$ adsorption. The figures for the pore size distribution and the surface area given above are determined after calcination of the catalyst at about 500° C. for one hour.

The catalyst is suitably in the form of spheres, pellets, beads, or extrudates. Examples of suitable types of extrudates have been disclosed in the literature (see, int. al., U.S. Pat. No. 4,028,227). Highly suitable are cylindrical particles (which may be hollow or not) as well as symmetrical and asymmetrical polylobed particles (2, 3 or 4 lobes).

The additive present in the catalyst may be any organic additive. In the context of the present specification the term organic additive refers to an additive comprising at least one carbon atom and at least one hydrogen atom. Preferred compounds include those selected from the group of compounds comprising at least two oxygen atoms and 2- about 20 carbon atoms, preferably 2- about 20 carbon atoms and the compounds built up from these compounds. Preferably, the organic compounds are substantially saturated, as is evidenced by an iodine number of less than about 20. Organic compounds selected from the group of compounds comprising at least two oxygen-containing moieties, such as a carboxyl, carbonyl or hydroxyl moieties, and 2- about 10 carbon atoms and the compounds built up from these compounds are preferred. Examples of suitable compounds include citric acid, tartaric acid, oxalic acid, malonic acid, malic acid, butanediol, pyruvic aldehyde, glycolic aldehyde, and acetaldol. At this point in time, preference is given to an additive that is selected from the group of compounds comprising at least two hydroxyl groups and 2- about 10 carbon atoms per molecule, and the ethers and polyethers of these compounds. Suitable compounds from this group include aliphatic alcohols such as ethylene glycol, propylene glycol, glycerin, trimethylol ethane, trimethylol propane, etc. Ethers of these compounds include diethylene glycol, dipropylene glycol, trimethylene glycol, triethylene glycol, tributylene glycol, tetraethylene glycol, tetrapentylene glycol. This range can be extrapolated to include polyethers like polyethylene glycol. Other ethers which are suitable for use in the present invention include ethylene glycol monobutyl ether, diethylene glycol monomethyl ether, diethylene glycol monoethyl ether, diethylene glycol monopropyl ether, and diethylene glycol monobutyl ether. Of these, ethylene glycol, diethylene glycol, triethylene glycol, tetraethylene glycol, proplylene glycol, dipropylene glycol, and polyethylene glycol with a molecular weight between about 200 and 600 are preferred.

Another group of compounds comprising at least two hydroxyl groups and 2- about 10 carbon atoms per molecule are the saccharides. Preferred saccharides include monosaccharides such as glucose and fructose. Ethers thereof include disaccharides such as lactose, maltose, and saccharose. Polyethers of these compounds include the polysaccharides.

A further group of additives are those compounds comprising at least one covalently bonded nitrogen atom and at least one carbonyl moiety. Examples include aminopolycarboxylic acids, such as nitrilo-triacetic acid and diethylene-triamine-pentaacetic acid. In this case the organic compound preferably comprises at least two nitrogen atoms and preferably at least two carbonyl moieties. It is further preferred that at least one carbonyl moiety is present in a carboxyl group. It is furthermore preferred that at least one nitrogen atom is covalently bonded to at least two carbon atoms. A preferred organic compound is a compound satisfying formula (I)

(R1R2)N—R3—N(R1'R2')  (I)

where R1, R2, R1' and R2' are independently selected from alkyl, alkenyl, and allyl with up to 10 carbon atoms optionally substituted with one or more groups selected from carbonyl, carboxyl, ester, ether, amino, or amido. R3 is an alkylene group with up to 10 carbon atoms which may be interrupted by —O— or —NR4—. R4 is selected from the same group as indicated above for R1. The R3 alkylene group may be substituted with one or more groups selected from carbonyl, carboxyl, ester, ether, amino, or amido. As has been set out above, it is essential that the organic compound of formula (I) comprises at least one carbonyl moiety.

Preferably, at least two of R1, R2, R1' and R2' have the formula —R5—COOX, wherein R5 is an alkylene group having 1–4 carbon atoms, and X is hydrogen or another cation, such as an ammonium, a sodium, a potassium, and/or a lithium cation. If X is a multivalent cation, one X can adhere to two or more —R5—COO groups. Typical examples of such a compound are ethylenediamine(tetra)acetic acid (EDTA), hydroxyethylenediaminetriacetic acid, and diethylenetriaminepentaacetic acid.

A single compound as well as a combination of compounds may be used as additive.

The amount of additive present in the additive-containing catalyst depends on the specific situation. It was found that the appropriate amount of additive generally lies in the range of about 0.01–2.5 moles of additive per mole of hydrogenation metals present in the catalyst. If the amount of additive added is too low, the advantageous effect associated with its presence will not be obtained. On the other hand, the presence of an exceptionally large amount of additive will not improve its effect.

The way in which the additive is incorporated into the catalyst composition is not critical to the process according to the invention. The additive may be incorporated into the catalyst composition prior to, subsequent to, or simultaneously with the incorporation of the hydrogenation metal components. For example, the additive can be incorporated into the catalyst composition prior to the hydrogenation metal components by being added to the carrier before the hydrogenation metal components are. This can be done by mixing the additive with the carrier material before it is shaped, or by impregnating the shaped carrier material with the additive.

Alternatively, the additive can be incorporated into the catalyst composition simultaneously with the hydrogenation metal components. This can be done, e.g., by mixing the additive and the hydrogenation metal components with the carrier material before shaping or by impregnating the carrier with an impregnation solution comprising the hydrogenation metal components and the additive, followed by drying under such conditions that at least part of the additive is maintained in the catalyst. This latter method is described in EP 601 722.

It is also possible to incorporate the additive into the catalyst composition subsequent to the hydrogenation metal components. This can be done, e.g., by first incorporating the hydrogenation metal components into the catalyst composition, e.g., by mixing them with the carrier material or by impregnating the carrier with them, optionally followed by drying and/or calcining, and subsequently incorporating the additive, e.g., by impregnation. The method with intermediate calcination is described in WO 96/41848. At present, the additive-containing catalyst prepared by the processes described in EP 0601 722 and WO 96/41848 are considered preferred as source for the additive-based catalyst to be sulfided in the process according to the invention.

Depending on the nature of the additive and the way in which it is incorporated into the catalyst composition, the additive may be used in solid form, in liquid form, or dissolved in a suitable solvent. It may be preferred for the additive to be incorporated into the catalyst dissolved in water.

Use of the Sulfided Catalyst Prepared According to the Invention

The catalyst sulfided by the process according to the invention can be used in the hydrotreating of hydrocarbon feeds. The hydrotreating generally takes place under conventional hydrotreating conditions, such as temperatures in the range of about 250–450° C., pressures in the range of about 5–250 bar, space velocities in the range of about 0,1–10 h$^{-1}$, and H$_2$/oil ratios in the range of 50–2000 NI/I. Examples of suitable feeds include middle distillates, kerosine, naphtha, vacuum gas oils, heavy gas oils and residues. Preferably, the hydrocarbon feed contains at least about 0.2 wt % of sulfur, calculated as atomic sulfur S. Examples of suitable hydrotreating reactions are (deep) hydrodesulfurisation, hydrodenitrogenation, hydrodearomatisation, and hydrodemetallisation. (Deep) hydrodesulfurisation, hydrodenitrogenation, and hydrodearomatisation are preferred.

The catalyst which is sulfided by the process according to the invention can be applied either in a reactor which is started up in the gas phase or in a reactor which is started up in the liquid phase, optionally in the presence of optionally spiked feed.

EXAMPLE 1

Starting Material

A conventional hydrotreating catalyst containing 26 wt. % molybdenum, calculated as trioxide, 4.7 wt. % nickel, calculated as oxide, and 6.7 wt. % phosphorus, calculated as P$_2$O$_5$, on a gamma-alumina carrier was impregnated by pore volume impregnation with a solution of diethylene glycol in water, containing 0.44 mole diethylene glycol per mole of the total of molybdenum and nickel. Then, the catalyst is dried rotating with hot air to a product temperature of 130° C.

Comparative Presulfiding Procedure

The additive-containing starting catalyst catalyst (10 ml) was sulfided in the gas phase at atmospheric pressure using a mixture of 10 vol. % H$_2$S in H$_2$ (flow=5 l/hr) in one step. The temperature was increased by 0.5° C. per minute to 300° C. (=10 hr) and held at that temperature for 3 hours.

One-step Presulfiding According to the Invention

The additive-containing starting catalyst was pore volume impregnated with SRGO (straight run gas oil) in an amount corresponding to 0.18 g SRGO per gram catalyst. This additive-containing SRGO-impregnated Ni—Mo—P/γ—Al$_2$O$_3$ catalyst (10 ml) was sulfided in the gas phase in one step in the same way as described above.

Two-step Presulfiding According to the Invention

The additive-containing starting catalyst was pore volume impregnated with SRGO (straight run gas oil) in an amount corresponding to 0.18 g SRGO per gram catalyst. This additive-containing SRGO-impregnated Ni—Mo—P/γ—$Al_2O_3$ catalyst (10 ml) was sulfided in the gas phase at atmospheric pressure using a mixture of 10 vol. % $H_2S$ in $H_2$ (flow=5 l/hr) in two steps. The temperature was first increased by 0.5° C. per minute to 180° C. and held at 180° C. for 3 hours. Then, the temperature was increased by 0.5° C. per minute to 300° C. and held at 300° C. for 3 hours.

Testing

The catalysts were tested in an upflow tubular reactor using a SRGO with the properties given in table 1. The reaction conditions are given in table 2.

TABLE 1 feedstock properties

| Type feed | Straight run gas oil |
|---|---|
| Nitrogen (ASTM D-4629) (ppm wt) | 115 |
| Sulfur (ASTM D-4294) (wt. %) | 1.2 |
| Density 15° C. (g/ml) | 0.84 |
| Dist. (° C.) (ASTM D 1160) | |
| IBP | 121 |
| 5 vol. % | 177 |
| 10 vol. % | 203 |
| 30 vol. % | 254 |
| 50 vol. % | 292 |
| 70 vol. % | 330 |
| 90 vol. % | 386 |
| 95 vol. % | 412 |
| FBP | 476 |

TABLE 2

Reaction conditions

| | 1st condition | 2nd condition |
|---|---|---|
| Temperature (° C.) | 340 | 340 |
| Pressure (bar) | 30 | 30 |
| $H_2$/oil (Nl/l) | 125 | 250 |
| LHSV (h-1) | 2.0 | 1.0 |

The oil product from the reactor was analysed, and the relative volume activities of the catalysts for hydrodesulfurisation, hydrodenitrogenation, and hydrodearomatisation were calculated, with the activity the starting material activated using the comparative presulfiding procedure being set at 100. The results are given in Table 3 below.

TABLE 3 test results

| | Comparative presulfiding procedure | | One-step presulfiding procedure according to the invention | | Two-step presulfiding procedure according to the invention | |
|---|---|---|---|---|---|---|
| condition | 1st | 2nd | 1st | 2nd | 1st | 2nd |
| RVA HDS | 100 | 100 | 188 | 193 | 204 | 203 |
| RVA HDN | 100 | 100 | 119 | 117 | 125 | 121 |
| RVA HAD | 100 | 100 | 143 | 138 | 136 | 145 |

This shows that one-step presulfiding procedure according to the invention, which includes a catalyst prewetting step, shows a highly improved activity as compared to the comparative presulfiding procedure. The activity obtained after a two-step presulfiding procedure, which is in accordance with a preferred embodiment of the invention, was even higher.

EXAMPLE 2

A conventional hydrotreating catalyst containing 24 wt. % molybdenum, calculated as trioxide, 4 wt. % nickel, calculated as oxide, and 7 wt. % phosphorus, calculated as $P_2O_5$, on a gamma-alumina carrier was impregnated by pore volume impregnation with a solution of ethylene diamine tetra-acetic acid (EDTA) in water, containing 0.11 mole EDTA per mole of the total of molybdenum and nickel. Then, the catalyst was dried rotating with hot air to a product temperature of 130° C.

The catalyst was presulfided according to the invention by prewetting it with SRGO followed by two-step gaseous presulfiding in the same way as described in example 1. The catalyst was subsequently tested in accordance with the process described in example 1. Table 4 shows the results obtained.

TABLE 4

| | Feed | Product 1st condition | Product 2nd condition |
|---|---|---|---|
| Sulfur content | 1.2 wt. % | 0.16 wt. % | 0.03 wt. % |
| Nitrogen content | 115 ppm | 54 ppm | 25 ppm |
| Aromatics content | 28.4 wt. % | 26.9 wt. % | 25.8 wt. % |

What is claimed is:

1. A process for sulfiding a catalyst composition comprising at least one hydrogenation metal component selected from the group consisting of Group VI and Group VIII of the Periodic Table, and an organic additive, wherein the catalyst composition is first contacted with an organic liquid, followed by the catalyst being contacted with hydrogen and a sulfur-containing compound in the gaseous phase, wherein less than about 40% of the sulfur present in the sulfided catalyst is added with the organic liquid, said catalyst being dried subsequent to addition of said organic additive and prior to said contact with said organic liquid.

2. The process of claim 1 wherein the sulfur-containing compound applied in the gaseous phase is $H_2S$.

3. The process of claim 1 wherein the organic liquid is a hydrocarbon with a boiling range of about 150–500° C.

4. The process of claim 3 wherein the organic liquid is selected from the group consisting of gasoline, white spirit, diesel, gas oil, mineral lube oil, and white oil.

5. The process of claim 1 wherein the organic liquid comprises less than about 12 wt. % of oxygen.

6. The process of claim 1 wherein the organic liquid comprises less than about 8 wt. % of oxygen.

7. The process of claim 1 wherein the organic liquid comprises less than about 5 wt. % of oxygen.

8. The process of claim 1 wherein the organic liquid comprises less than about 2 wt. % of oxygen.

9. The process of claim 1 wherein the organic liquid comprises less than about 0.5 wt. % of oxygen.

10. The process of claim 1 wherein the organic liquid has an iodine number of about 50 or less.

11. The process of claim 1 wherein the organic liquid has an iodine number of about 30 or less.

12. The process of claim 1 wherein the organic liquid contains less than about 10 wt. % of sulfur.

13. The process of claim 1 wherein the organic liquid contains less than about 5 wt. % of sulfur.

14. The process of claim 1 wherein the amount of organic liquid contacted with the catalyst is about 20–500% of the catalyst pore volume which can be filled with the liquid under the conditions at which contact occurs.

15. The process of claim 1 wherein the organic additive comprises at least one carbon atom and at least one hydrogen atom.

16. The process of claim 15 wherein the organic additive comprises the group of compounds comprising at least two oxygen atoms and 2- about 20 carbon atoms and the compounds built up from these compounds.

17. The process of claim 16 wherein the organic additive is selected from the group of compounds comprising at least two hydroxyl groups and 2- about 10 carbon atoms per molecule, and the ethers and polyethers of these compounds.

18. The process of claim 1 wherein the organic additive is incorporated into the catalyst composition prior to, subsequent to, or simultaneously with the incorporation of the hydrogenation metal components.

19. The process of claim 1 wherein the organic additive comprises about 0.01–2.5 moles of additive per mole of hydrogenation metals present in the catalyst.

20. The process of claim 1 wherein the catalyst has a metal content in the range of about 0.1 to about 50 wt. % calculated as oxides on the dry weight of the catalyst not containing the organic additive.

21. The process of claim 1 wherein the Group VIB metal is present in an amount of about 5–40 wt. %, calculated as trioxide.

22. The process of claim 1 wherein the Group VIII metal is present in an amount of about 1–10 wt. %, calculated as monoxide.

23. The process of claim 1 wherein the group VI metals are selected from Mo and/or W and the group VIII metals are selected from Co and/or Ni.

24. The process of claim 22 wherein the amount of sulfur incorporated into the catalyst is selected to correspond to about 50–500% of the stoichiometric sulfur quantity necessary to convert the hydrogenation metals into $Co_9S_8$, $MoS_2$, $WS_2$, and/or $Ni_3S_2$, respectively.

25. The process of claim 1 wherein the contacting of the catalyst with hydrogen and a sulfur-containing compound in the gaseous phase takes place in one step at a final temperature of about 150–500° C.

26. The process of claim 1 wherein the contacting of the catalyst with hydrogen and a sulfur-containing compound in the gaseous phase is carried out in two steps, with the first step being performed at a final temperature which is lower than that of the second step.

27. The process of claim 22 wherein the first step is carried out at a final temperature of about 100–250° C. and the second step is carried out at a final temperature of about 150–500° C.

28. The process of claim 1 wherein the organic additive is an organic compound which comprises at least two nitrogen atoms and at least two carbonyl moieties.

29. The process of claim 1 wherein both the contacting with the organic liquid and the contacting with hydrogen and a sulfur-containing compound are carried out ex situ.

30. The process of claim 28 wherein the ex situ sulfided catalyst is passivated after the treatment with hydrogen and the sulfur-containing compound.

31. The process of claim 1 wherein less than about 35% of the sulfur present in the sulfided catalyst is added with the organic liquid.

32. The process of claim 1 wherein less than about 25% of the sulfur present in the sulfided catalyst is added with the organic liquid.

33. The process of claim 1 wherein less than about 15% of the sulfur present in the sulfided catalyst is added with the organic liquid.

34. A catalyst composition obtained by the process of claim 1.

* * * * *